(12) United States Patent
Müller

(10) Patent No.: US 8,915,290 B2
(45) Date of Patent: Dec. 23, 2014

(54) DIECASTING DIE AND DIECASTING METHOD

(75) Inventor: Walter Müller, Battenberg/E. (DE)

(73) Assignee: Ferrofacta GmbH, Allendorf (DE)

( * ) Notice: Subject to any disclaimer, the term of this patent is extended or adjusted under 35 U.S.C. 154(b) by 0 days.

(21) Appl. No.: 13/988,021

(22) PCT Filed: Nov. 16, 2011

(86) PCT No.: PCT/DE2011/075274
§ 371 (c)(1),
(2), (4) Date: May 17, 2013

(87) PCT Pub. No.: WO2012/076008
PCT Pub. Date: Jun. 14, 2012

(65) Prior Publication Data
US 2013/0233507 A1    Sep. 12, 2013

(30) Foreign Application Priority Data

Nov. 17, 2010   (DE) .......................... 10 2010 060 640
May 5, 2011     (DE) .......................... 10 2011 050 149

(51) Int. Cl.
| | |
|---|---|
| B22D 17/22 | (2006.01) |
| B22D 17/02 | (2006.01) |
| B22D 17/20 | (2006.01) |
| B29C 33/00 | (2006.01) |
| B29C 45/27 | (2006.01) |

(52) U.S. Cl.
CPC ............ *B22D 17/2218* (2013.01); *B22D 17/02* (2013.01); *B22D 17/2023* (2013.01); *B22D 17/2038* (2013.01); *B29C 33/0077* (2013.01); *B29C 45/2708* (2013.01)
USPC ............ 164/113; 164/492; 164/309; 164/316

(58) Field of Classification Search
CPC . B22D 17/02; B22D 17/2023; B22D 17/2038
USPC .................. 164/113, 309, 316, 492
See application file for complete search history.

(56) References Cited

U.S. PATENT DOCUMENTS

| | | |
|---|---|---|
| 4,370,115 A | 1/1983 | Miura |
| 5,439,047 A * | 8/1995 | Eckert ........................... 164/471 |

(Continued)

FOREIGN PATENT DOCUMENTS

| | | |
|---|---|---|
| DE | 4404862 A1 | 9/1994 |
| DE | 19543805 A1 | 5/1997 |

(Continued)

*Primary Examiner* — Kevin E Yoon
(74) *Attorney, Agent, or Firm* — Michael Soderman

(57) ABSTRACT

The invention relates to a diecasting die (7) and a diecasting method for sprueless diecasting, in particular in a diecasting hot-runner system (1), wherein the diecasting die (7) is provided in a feeding region (8) for forming a plug of solidified molten material (22) that interrupts a flow of the molten material and can be completely remelted.

The problem addressed by the present invention is therefore that of providing a diecasting die and a diecasting method according to the preamble of the invention that are suitable for different molten materials, in which a heating acts directly on the molten material with high power and largely without delay, a cooling is not required and the injection-molding method can be carried out at a high operating machine speed and under feeding conditions that can be monitored and reproduced well.

The problem is solved by the feeding region (8) comprising direct resistance heating that produces a melting heat and is in direct thermal contact with the molten material (22). The problem is also solved by a diecasting method with the method steps of closing the casting mold, heating the diecasting die (7), melting the plug in the feeding region (8), stopping the heating, injecting the molten material (22) into the casting mold, maintaining the pressure of the molten material (22), solidifying the molten material (22) in the casting mold and in the feeding region (8) of the diecasting die (7), opening the casting mold (43, 44) and removing a cast part from the casting mold.

4 Claims, 9 Drawing Sheets

(56) References Cited

U.S. PATENT DOCUMENTS

| | | | | |
|---|---|---|---|---|
| 5,456,592 A | * | 10/1995 | Shindo | 425/549 |
| 5,960,854 A | * | 10/1999 | Fink et al. | 164/316 |
| 2008/0115907 A1 | * | 5/2008 | Li et al. | 164/113 |

FOREIGN PATENT DOCUMENTS

| | | |
|---|---|---|
| DE | 10359692 A1 | 7/2004 |
| WO | 03018234 A2 | 3/2003 |

* cited by examiner

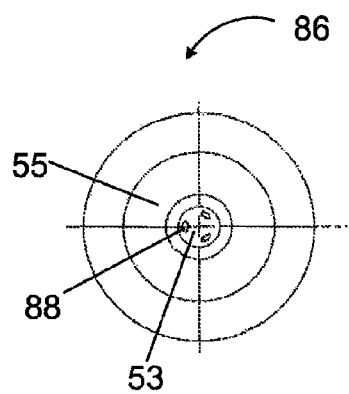
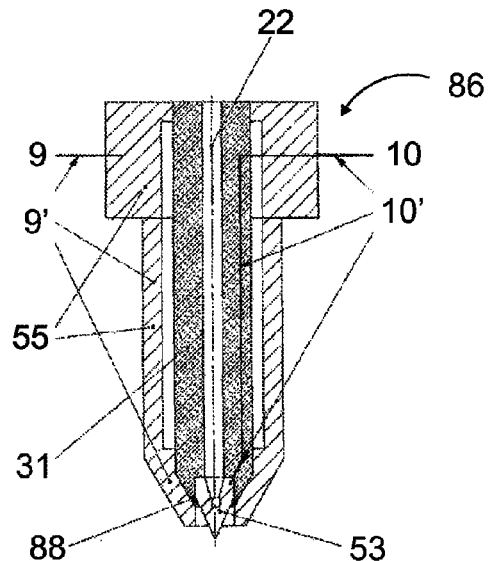
Fig. 11a             Fig. 11b
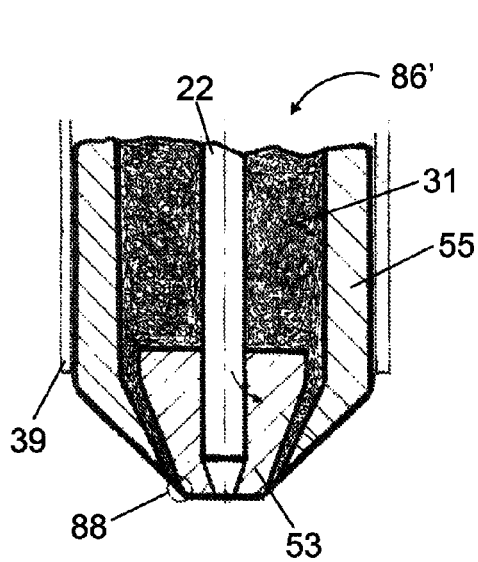
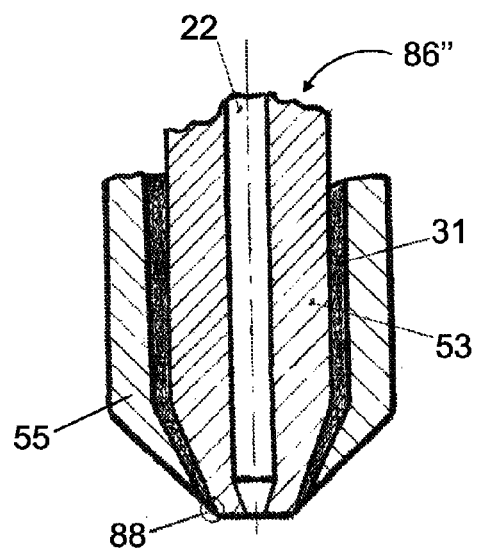
Fig. 12a             Fig. 12b

DIECASTING DIE AND DIECASTING METHOD

CROSS REFERENCE TO RELATED APPLICATIONS

This application is the U.S. national stage of International Application No. PCT/DE2011/075274, filed on Nov. 16, 2011, and claims the benefit thereof. The international application claims the benefits of German Application Nos. DE 10 2010 060 640.5 filed on Nov. 17, 2010; and DE 10 2011 050 149.5 filed on May 5, 2011; all applications are incorporated by reference herein in their entirety.

BACKGROUND

The invention relates to a diecasting die and a diecasting method for sprueless diecasting, in particular in a diecasting hot-runner system, wherein the diecasting die is provided in a feeding region for forming a plug of solidified molten material that interrupts a flow of the molten material and can be completely remelted.

The sprue, which solidifies in the runners between the diecasting die and the casting mould in conventional diecasting processes, causes an additional material effort that usually amounts to 40% to 100% of the cast part. Even when the sprue is remelted for material recycling it still results in losses of energy and quality. The sprueless diecasting method avoids these disadvantages.

The sprueless diecasting method requires the liquid molten material to be either taken from the smelter to the mould and back for each cast or to be maintained in this state directly near the mould. The latter is achieved by the hot-runner method where all runners up to the mould are heated so that the molten material is kept in liquid state and at the same time prevented from flowing back into the smelter.

The backflow into the smelter can be prevented by valves, but also by a plug of solidified molten material which closes the gate in the diecasting die.

Devices and methods for sprueless diecasting to the formation of a plug of solidified molten material that seals a feeding region against a flow of molten material and can be remelted are known to the state of the art. Such devices and methods are described in particular for the diecasting of non-ferrous metals and especially plastics.

The publication DE 19846710 B4, which covers the injection moulding of plastics, envisages a heat withdrawal on the die opening, which would cause the molten material in this area to solidify. This prevents the molten material from flowing back into the runners and into the smelter.

A specific control of the remelting process of the solidified molten material, however, is not designed. Instead, the formed plug cannot be removed until the demoulding of the cast part.

Furthermore, the EP 1201335 A1 describes a hot-runner method for non-ferrous metals with a heated feeding tip, the feeding region, in which the molten material backflow into the runners and into the smelter is prevented by a plug in the unheated die tip. The feeding tip is heated on the outside. The plug comes off the wall of the feeding tip and is forced out of the die tip by the molten material that is injected in the next casting.

A receiver for plug is required to prevent the solid plug from being hurled into the mould. However, this would interfere with the molten material flow during the injection. Since the material is injected into the mould at a speed of 50-100 m/s the mould could also be damaged by a loose plug that is dragged along by the molten material. It is not possible to fully remelt the plug in a controlled way. Even if one would try to solve this problem, the solution would require very long cycle periods affecting productivity negatively.

The object of the publication DE 4319306 A1 is a sprueless injection moulding method for synthetic resins. For this purpose an injection moulding device with a feeding runner equipped with a tip heating was designed. Though the injection nozzle has a two-section heating—separated for the nozzle body and the nozzle tip—for a specific control of the molten material, the heating again takes place through the injection nozzle wall, which delays the heat provided by the heating in reaching the molten material. Furthermore, an additional valve pin is required to control the molten material inflow since no sealing plug is formed. On top of that, this system is only suitable for the injection moulding of plastics as the installation of a heating system in the nozzle tip would either decrease its compressive strength in such manner that it could not sustain the pressures present during the diecasting of metals, or would result in a massive nozzle tip structure that increases the thermal inertia of the material between the heating and the molten material and thus causes very long cycle periods.

The subject of the publication DE 3809643 is the sprueless injection moulding of synthetic resins. For this method, the gate is sealed by cooling it, and is re-opened by reheating it. However, this requires a complex gate which would allow for both a heating of the resin in the nozzle as well as a heat transfer to a cooling medium.

The publication DE 3531127 A1 describes an element which enables the gate of an injection moulding nozzle for resins to be sealed and opened by means of thermal effects. On the tip of the element, the molten material is solidified by means of cooling so that it seals the gate. When the tip is heated by a heating element built into the element, the material melts again. The cooling is ensured by not transferring any more heat to the tip of the element after the heating element is turned off and by dissipating the present heat from the tip. This eliminates the need for additional cooling equipment.

However, the element must be built into the gate additionally. Furthermore, the heating is placed in the element, which results in delayed heat dissipation from the inside to the outside and affects the speed of the injection moulding process adversely. The hollow internal space reserved for the heating element affects the compressive strength, which becomes a problem especially for the diecasting of molten metals.

The publication DE 2542875 also covers a solidified plug in the nozzle tip for the injection moulding of thermoplastics with the objective of sealing it. The remelting is achieved by the further flow of heat from the nozzle body; however, additional heating and cooling elements were designed as well.

In this case, too, the heating is designed to take place from outside of the nozzle, which increases the response time of the process and which cannot control the liquefaction resp. solidification of the molten material in the nozzle sufficiently—despite envisaged temperature sensors.

Though the sealing of a nozzle by a plug of solidified molten material is known to the state of the art for injection moulding and diecasting of different materials, especially for the sprueless injection moulding—and it is known that this plug can be remelted by means of heating—the state of the art also indicates that all attempts at bringing the temperature influence element as close to the molten material as possible with the intention to increase the speed and controllability of the casting process, have amounted to nothing more than bringing the indirect heating close to the molten material with the separation of a wall between the two still existent. A fast casting process and a high thermal output on the feeding point cannot be achieved with the known devices, in particular because an increasing pressure—in the interest of short cycle periods—would also require an increased thickness of the diecasting die, which would in turn increase the inertia further.

SUMMARY

The problem addressed by the present invention is therefore that of providing a diecasting die and a diecasting method according to the preamble of the invention that are suitable for different molten materials, in which a heating acts directly on the molten material with high power and largely without delay, a cooling is not required and the injection-moulding method can be carried out at a high operating machine speed and under feeding conditions that can be monitored and reproduced well. The problem is solved by a diecasting die for sprueless diecasting, in particular in a diecasting hot-runner system, wherein the diecasting die is provided in a feeding region for forming a plug of solidified molten material that interrupts a flow of the molten material and can be completely remelted, wherein the feeding region comprises a direct resistance heating that produces a melting heat and is in direct thermal contact with the molten material.

DETAILED DESCRIPTION

The inventive diecasting die is suitable for the diecasting of molten metals in hot-runner and cold-runner systems as well as for the injection moulding of plastics. Casting can take place with filled and empty runners. However, the advantages of casting with filled, permanently heated runners are a significantly higher cycle speed resulting in improved productivity, since the molten material probably has to be taken from the smelter for each cycle. In addition, permanently filled runners result in a higher and consistent quality of the cast parts as impurities due to oxide layers are prevented. To prevent the backflow of the molten material from the runner into the smelter, the diecasting die has to be sealed in order to prevent air from flowing further in. As a consequence the diecasting die and the runners remain filled with molten material up to the smelter.

The diecasting die can process conducting and non-conducting materials. Thanks to the largely instantaneous introduction of a high amount of heat energy into the molten material in the feeding region this region is completely filled with liquid molten material prior to the injection of the molten material. The largely instantaneous introduction of heat energy is achieved by the direct thermal contact between the molten material and the direct resistance heating. This ensures that exclusively liquid molten material is injected into the mould and that no solid plugs that are only partly remelted can be hurled into the mould together with the molten material. Due to the high entry speeds of the molten material ranging from 50-100 m/s, this plug would cause damage to the mould surface or inhomogenities in the cast part.

The direct resistance heating moreover allows for a robust structure of the diecasting die, in particular in the feeding region, so that it can sustain even the high pressures present in the diecasting of molten metals.

In the inventive diecasting die the heat is applied to a closely limited are in a targeted and energy efficient way.

Since the inventive diecasting die is designed directly on the feeding region of the mould, even if it is a multi mould, sprues on the cast part are completely eliminated. The advantages resulting thereof are the elimination of waste material and the energy-consuming remelting and regeneration of this material. Moreover, no oxide foam is generated, transport costs are reduced and finishing work to remove sprues from the cast parts are not necessary.

An especially advantageous embodiment would include the direct resistance heating in the form of a short-circuit heating where the circuit in the feeding region includes a conducting molten material. The direct short-circuit heating is generally applicable for all conducting molten materials. For this embodiment, both of the terminals are routed to the feeding region of the diecasting die separately. In the feeding region, both terminals are connected through the molten material. This turns the molten material into an essential component of the resistance heating, so that the heat of the resistance heating is cut off immediately in the molten material without requiring any further heating elements. This minimises the inertia of the heating and hence the cycle period of the diecasting hot-runner system.

It has proven especially advantageous when, for the diecasting die, a conducting runner—preferably the die wall—has a first polarity, and a conducting molten material has a second polarity. This embodiment would require only one terminal to be routed to the feeding region, since the other terminal is the molten material itself.

An especially advantageous embodiment comprises a die wall made of titanium. Despite its good conductance, titanium has a relatively low thermal conductivity—approx. a third compared to steel—so that it is a good insulator. With this design, the die has only little reheating requirements to maintain the molten material's specified temperature.

Another advantageous embodiment is a diecasting die having a conducting electrode that has a second polarity and that is electrically insulated against the molten material and a conductor, preferably made of metal, both of which have a conducting terminal section free from insulation on their respective end routed towards the feeding region that is in contact with the molten material. For this embodiment, the polarity of the molten material could be disregarded, as both terminals are routed separately to the feeding region and do not come into contact with the molten material until they reach the direct resistance heating section.

Specific advantages would result from a feeding region designed as insulating, wear-resistant insert. Thermal insulation properties prevent heat dissipation from the molten material into the mould, so that it can maintain its temperature without or with reheating to a limited extent. For electrically insulating properties of the insert the requirement of insulating the mould otherwise against the die can be omitted. With a separate insert one can use a high-quality, wear-resistant material in low amount so that it still results in a cost-effective solution. Moreover, a worn insert can be replaced easily without having to replace the whole diecasting die, which also results in reduced costs.

For this embodiment, the insulating, wear-resistant insert is preferably made of ceramics. This material is especially wear-resistant with respect to the aggressive molten zinc that—beside its abrasive effects—reduces the strength of a steel die due to its high temperature and also tends to form alloys with steel.

It has furthermore proven advantageous to design the molten material runner as a carbon pipe. This material is as resistant against the molten material as the ceramics specified above. Carbon can also be heated electrically and can thus be used to maintain the molten material temperature on the required level.

To increase the flexibility in the application of the inventive diecasting die, it is advantageous to design the direct resistance heating as indirect short-circuit heating, wherein the circuit in the feeding region comprises a conducting short-circuit element between the die wall (which preferably serves as outer runner duct) and a molten material runner (which serves as inner runner duct). This would enable the casting of conducting molten materials, molten conducting alloys with different melting points of the alloy components, and non-conducting molten materials. In any case the heat generated by the direct resistance heating will be emitted from the short-circuit element. Since this element is in direct contact with the molten material, a largely instantaneous remelting process is possible. For this embodiment it is especially advantageous that not the conductance and the electrical properties of the molten material are important, but that the short-circuit element itself has consistent electrical properties which cause conditions that can be reproduced independently from the type of molten material.

It has furthermore proven advantageous to provide a contacting possibility for the outer runner duct with a first polarity and the inner runner duct via the conducting molten material with a second polarity. The outer runner duct and the inner runner duct can hence come into contact electrically with opposed polarities, wherein a special conductor up to the feeding region is not required when this conductor requires power supply.

Particular advantages result from a direct resistance heating designed as a low-voltage, high-current direct resistance heating that can be controlled and/or regulated with regard to its output. This would allow for the setting of an absolutely precisely controlled output, e.g. by means of using a generalised phase control, a resistor control, or in another way. This helps to reduce the wear in the feeding region. An especially advantageous design involves the use of high-current DC voltage. This minimises the electrolytic influence of the molten material on the die tip and the feeding region. When a suitable polarity is chosen, adverse effects on the die tip can be minimised.

The control of the direct resistance heating comprises discrete switching as well as reducing and increasing the heating output without having to turn it on or off completely.

The problem is also solved is furthermore by a diecasting method for sprueless diecasting, in particular in a diecasting hot-runner method, wherein a plug is formed in the diecasting die according to one of the previous claims of solidified molten material that interrupts the flow of the molten material, with the following process steps:

1. Closing the mould: The closing of the mould takes place after removing the cast part that was produced in the work cycle before. In this cycle, the mould is closed so tightly that it can sustain the high pressure of the molten material.
2. Heating the diecasting die and completely remelting the plug in feeding region of the diecasting die by increasing the direct resistance heating output: The output is increased based on a no-load current, in the sense of activation, from a completely interrupted current flow. The introduced heat output is so great that the plug of solidified molten material is not only melted on the outside and comes off the feeding region wall, but it is remelted completely. Thus it is mixed completely with the molten material that is injected into the mould afterwards and does not leave any traces, e.g. in the form of inhomogeneity, in the cast part.
3. Turning off the heating by decreasing the direct resistance heating output: The complete deactivation resp. the significant reduction of the thermal output is especially important for methods involving the die being lifted from the mould. This method would cause a short circuit when the die comes into contact with the mould, which would prevent any further heating anyway. However, a continued heating is not required in any case, even when the die is not lifted, since the amount of heat contained in the molten material flow is ensured by the molten material flowing in with a high temperature.
4. Injection of the molten material into the mould: The molten material flows through the die and into the mould until the latter is fully filled with molten material and the material flow comes to a stop.
5. Maintaining the pressure of the molten material: When no molten material flows further any more, the pressure that was applied to the molten material during its injection into the mould is maintained until it has solidified in the mould. This ensures a safe filling of all cavities in the mould and prevents entrapped air and other casting defects.
6. Solidification of the molten material in the mould: In the filled mould the molten material solidifies and becomes the cast part. The solidification process can be accelerated by cooling runners in the mould in which a coolant is circulated. The coolant transports the heat of the cast part away.
7. Solidification of the molten material in the feeding region of the diecasting die. With the solidification of the molten material into the cast part that is still in direct contact with the diecasting die, the heat of the molten material in the feeding region of the diecasting die is dissipated into the cast part, which is now cool, too. This causes the molten material in this area to solidify, which results in a sealing of the region. The feeding region of the diecasting die is hence sealed by a plug. The molten material that is behind the plug in the diecasting die can neither flow out of the die nor draw air into the diecasting die and flow back into the smelter through the runners. Hence the diecasting die remains filled with liquid molten material together with the runners. In an alternative embodiment, an additional check valve closes in at least one of the molten material distributors and further prevents the molten material backflow.
8. Opening the mould: For the removal of the cast part the opening of the mould is required. Since the diecasting die is sealed by the molten material plug, no molten material can come out when the mould is opened.
9. Demoulding a cast part from the mould: After the opening of the mould the cast part can be demoulded, i.e. removed from the mould.

This way the sprueless diecasting hot-runner system equipped with the inventive diecasting die ensures conditions that can be well reproduced, resulting in a high, consistent cast part quality. In particular, the wall thickness of the cast part can be minimised with respective material reductions thanks to this improved quality.

In an alternative embodiment of the inventive method the deactivation of the heating is followed by the diecasting die being put onto the mould with the feeding region, and the solidification of the molten material in the mould and in the feeding region of the diecasting die is succeeded by the lifting of the diecasting die from the mould. This does not require the die tip to be insulated against the mould. The die design is thus simpler and more cost-effective.

It is especially advantageous to choose the polarity of the direct resistance heating dependent on the materials of the diecasting die and the molten material in such a way that the electrolytic influence and the wear of the feeding region are minimised. The polarity is therein specified by the materials chosen for the die design and the molten material. This enables a particularly low-wear operation of the diecasting die.

It has furthermore proven advantageous to control the direct resistance heating output in the feeding region in such way that the wear of the feeding region is minimised. The control device therein only emits the output required for remelting the molten material plug in the feeding region. This reduces the wear of the diecasting die in the feeding region again. The control of the heating output is therein done according to the molten material and other parameters of the diecasting die, e.g. the injection geometry. As an alternative to a control based on fixed parameters a control is envisaged that processes sensor readings and adjusts the heating output accordingly. The sensors envisaged are temperature sensors in the diecasting die region, but also other sensors such as pressure sensors in the runners.

BRIEF DESCRIPTION OF THE DRAWINGS

Further embodiments and advantages of the invention are illustrated in the description of the Figures. Shown by:

FIG. 11a: is a schematic top view of an embodiment of an inventive diecasting die with an indirect resistance heating;

FIG. 11b: is a schematic sectional view of an embodiment of an inventive diecasting die with an indirect resistance heating;

FIG. 12a: is a schematic sectional view of an embodiment of an inventive diecasting die with an indirect resistance heating and a short conducting molten material runner;

FIG. 12b: is a schematic sectional view of an embodiment of an inventive diecasting die with an indirect resistance heating and a long conducting molten material runner;

DETAILED DESCRIPTION OF THE PREFERRED EMBODIMENT

Figure 1:
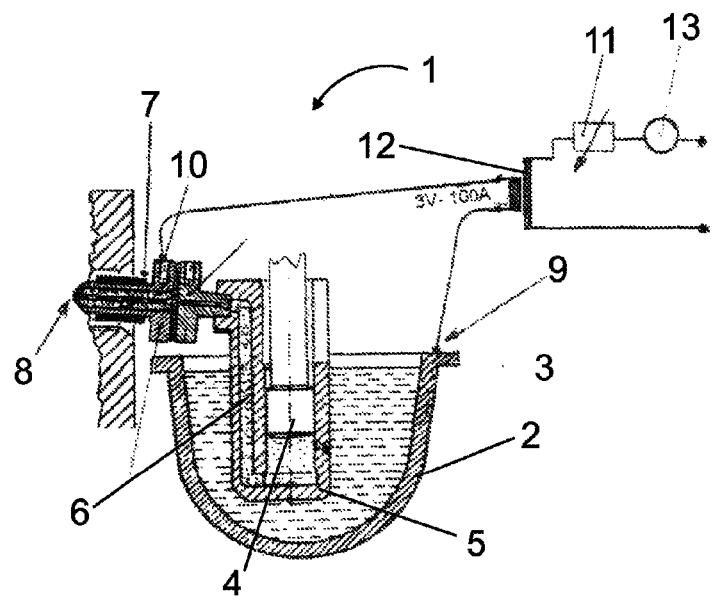
FIG. 1: is a schematic sectional view of a diecasting hot-runner system with an embodiment of an inventive diecasting die in starting position.

FIG. 1 shows a schematic sectional view of a diecasting hot-runner system 1 with an embodiment of an inventive diecasting die 7 in starting position for a new casting process, e.g. after closing the mould, which is not shown here. The diecasting hot-runner system 1 comprises a smelter 2 that is equipped with a heating now shown here, by means of which the molten material 3 is maintained in a liquid state of matter. Protruding into the molten material 3 is a cylinder 5 that fills with molten material 3. Positioned in the cylinder 5 is a piston 4 in a mobile manner, so that it can press the molten material 3 in the cylinder 5 through a runner 6 in a very short time, preferably between 10 and 100 ms.

The runner 6 leads to a diecasting die 7 that features a feeding region 8 on the end opposite of the runner 6.

The smelter 2 is equipped with a power connection 9 for a first terminal and the diecasting die 7 is equipped with a power connection 10 for a second terminal. Both connections 9, 10 are connected to a transformer 12 on the secondary side by electric leads, which is connected on the primary side to a known power source, a control device 11 for the current, and a control device 13 for the activation timing. An alternative embodiment envisages the control device 11 and the control device 13 to be combined in such way that the current corresponds to the requirement of the respective current in the process sequence without requiring discrete switching. In particular, this embodiment prefers a generalised phase control, e.g. by use of a thyristor.

The transformer 12 supplies a high current with a low voltage. The current is between 20 and 500 A, preferably 100 A. The secondary stable voltage on the transformer 12 is 0.5-42 V, preferably 3 V. A low voltage allows for a very simple power supply that requires neither specific insulation nor safety conditions. In the preferred embodiment a power of 300 W is applied on the feeding region 8 to heat the molten material there. An alternative envisages a variable voltage, in particular under consideration of the electrolytic conditions in the feeding region.

Figure 2:
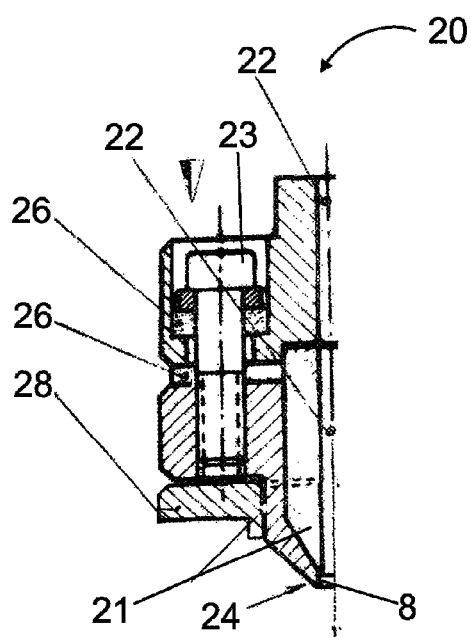
FIG. 2: is a schematic single-side sectional view of an embodiment of an inventive diecasting die in a short design.

FIG. 2 shows a schematic single-side sectional view of an embodiment of an inventive diecasting die 20 in a short design. The short design allows for an omission of an additional heating of the diecasting die 20, since the distributor not shown here and the molten material 22 introduce sufficient heat into the die body. The molten material is injected into the region leading toward the die tip 24 via a central runner coming from the distributor. In the die tip 24 area the molten material 22 flows through an insulation body 21 that insulates the molten material 22 against a part of the diecasting die 20, which has the opposite polarity of the molten material 22.

The illustrated embodiment of an inventive diecasting die 20 is suitable for permanent contact with the mould not shown here. This eliminates the lifting of the diecasting die 20 from the mould each cycle. This requires an electric insulation against the mould which is realised by means of the insulation ring 28. To insulate the die tip 24 against the other components of the diecasting hot-runner system further insulators 26 are envisaged. These insulate the part of the diecasting die 7 that is not connected to the die tip 24, and the bolt connection 23 against the other part of the diecasting die 7 that is connected to the distributor. Thanks to this, both terminals of the power required for the heating are routed up to the feeding region. This is where the short-circuit heating becomes effective.

Figure 3:
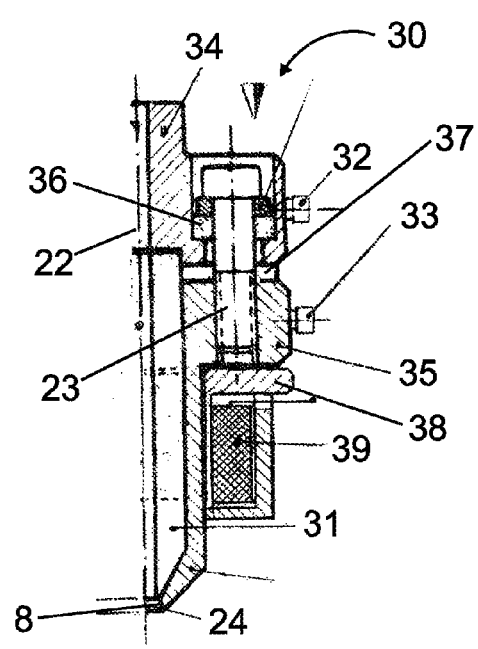
FIG. 3: is a schematic single-side sectional view of an embodiment of an inventive diecasting die in a long design with a heating element.

FIG. 3 shows a schematic single-side sectional view of an embodiment of an inventive diecasting die 30 in a long, basically two-section design with a heating element. The design of the diecasting die 30 is in basic elements similar to that of the diecasting die 20 and features a first die element 34 that is attached to a distributor and insulated against a second die element 35 by means of the insulator 37. Another insulator 36 is envisaged to electrically insulate the bolt connection 23 as well. The diecasting die 30 is equipped with an insulator ring 38 as well to insulate it electrically when it is put onto the mould. This allows for a heating operation of the diecasting die 30 independently from the polarity of the mould and without having to lift the die from the mould during heating operation.

Envisaged as insulators 36, 37, 38 are insulating materials with sufficient mechanical strength. In particular, ceramic materials or alternatively metallic materials coated with a ceramic layer are preferred.

Both die elements 34, 35 have power connections 32, 33. The first terminal, which is connected to the power connection 32, determines the polarity of the molten material that flows through the central runner of the diecasting die 30. The second terminal is connected to the power connection 33 and applies this polarity to the second die element 35 and further through the second die element 35 to the die tip 24. The insulation between the molten mass and the die tip 24 is achieved by the insulation body 31 that reaches up to the feeding region 8 of the die tip 24. This way the feeding region 8 is kept free from insulation so that the molten material 22 comes into contact with the die tip 24 and a short-circuit current flows in feeding region 8, so that the heating of the molten material takes place exclusively in the feeding region 8.

Due to its the large length the diecasting die 30 has to be equipped with an additional die runner heating 39. This heating ensures the maintaining of the required molten material 22 temperature on its way from the distributor not shown here to the die tip 24 resp. the feeding region 8.

Figure 4:
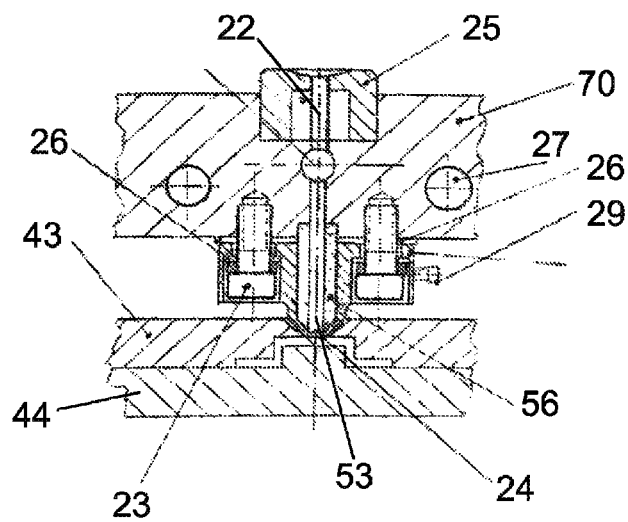
FIG. 4: is a schematic sectional view of an embodiment of an inventive diecasting die in a short design, with a distributor and a mould.

FIG. 4 shows a schematic sectional view of an embodiment of an inventive diecasting die 56 in a short, basically monobloc design, with a distributor 25 with which the diecasting die 56 is connected by bolts, and a mould 43, 44 engaged with the diecasting die 56. The mould 43, 44 is closed; both halves of the mould are placed onto each other and form a hollow space to be filled with molten material. Directly engaged with the hollow space is the diecasting die 56 with the die tip 24. The die tip 24 reaches directly up to the later cast part which completely eliminates any sprues on the cast part.

The diecasting die 56 has a power connection 29 to which a first polarity is routed. This polarity is applied to the complete diecasting die 56. An insulation on the die tip 24 not shown here prevents a conducting contact with the upper section of the mould 43. This enables the diecasting die 20 with its die tip 24 to be inserted permanently into the respective recess of the mould 43, 44 without affecting the functionality of the resistance heating. In the especially preferred embodiment, the insulation consists of a thin baked spray film of ceramics that has sufficient thermal conductivity properties at the same time.

The second polarity that is not shown here is routed via the molten material 22 to the die tip 24 where it comes through the resistance heating in order to heat the molten material 22 in the area of a feeding region 8 not shown here. The distributor 25 and the other elements of the diecasting hot-runner system not shown here have the second polarity as well. To separate the polarities until the die tip 24 the diecasting die 56 is insulated against the distributor bushing 25 by means of the insulation 26 and the bolt connection has another insulation 26.

The molten material sub-distributor 70 that has multiple diecasting dies 56 in the preferred embodiment of the diecasting die 56 is heated by the heating elements 27. This keeps the molten material 22 in the area of the molten material sub-distributor 70 in a liquid state of matter. Furthermore, the heat generated by the heating elements 27 is transferred to the diecasting die 56 via the contact surface between the molten material sub-distributor 70, the diecasting die 56, and the bolt connections 23. This is also used to heat the molten material 22 in the molten material runner 53 through which the molten material 22 flows to the diecasting die 56.

Figure 5:
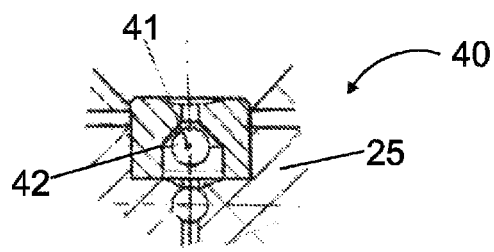
FIG. 5: is a schematic sectional view of a check valve of an embodiment of an inventive diecasting die.

FIG. 5 shows a schematic sectional view of an embodiment of a check valve 40 of an inventive diecasting die 7, 20, 30, 45, 50, 50', 56, 60, 60', 86, 86' and 86". In its preferred embodiment, the check valve 40 is positioned between the molten mass sub-distributor 70 and the downstream runners not shown here leading to the smelter also not shown here. The check valve 40 prevents the molten material 22 from flowing back into the runners and into the smelter by closing in the flow direction towards the smelter. This way the check valve 40 supports the functionality of the plug in the feeding region of the diecasting die 7, 20, 30, 45, 50, 50', 56, 60, 60', 86, 86' and 86".

The check valve 40 further enables a reset of the molten metal 22 in the short-circuit region, in the feeding region 8 of the diecasting die 7, 20, 30, 45, 50, 50', 56, 60, 60', 86, 86' and 86" after the power interruption, i.e. after deactivating the heating, by approx. 2 mm. This disconnects the contacting of the molten material 22.

The check valve 40 is equipped with a sealing element 41 that is preferably designed as a ball and made of a heat-resistant, preferably ceramic material. The sealing element 41 functions in conjunction with a valve seat 42.

Figure 6:
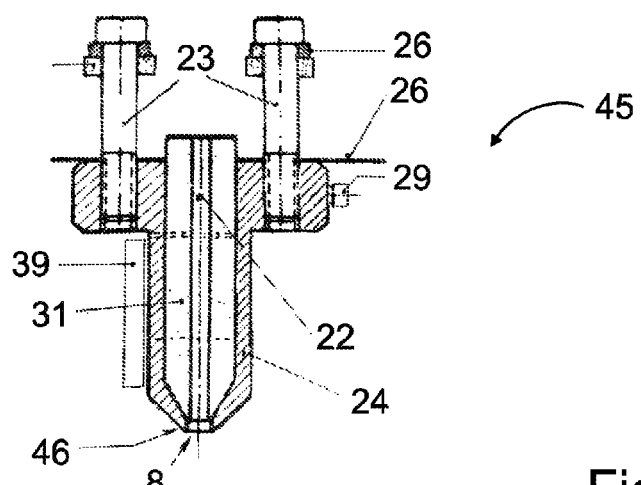
FIG. 6: is a schematic sectional view of an embodiment of an inventive diecasting die in a long design with a heating element.

FIG. 6 shows a schematic sectional view of an embodiment of an inventive diecasting die 45 in a long, basically monobloc design with a heating element 39. The diecasting die 45 can receive a molten material distributor not shown here that is similar to the illustration in FIG. 4. The attachment is achieved by bolt connections 23 which also feature insulators 26 for insulation against the molten material sub-distributor.

Another insulator 26 serves to insulate the contact surface of the diecasting die 45 against the surface of the molten material sub-distributor.

The whole die tip 24 has a first polarity that is routed to it via the power connection 29. The second polarity is routed by the molten material 22 that flows within the insulator body 31 and is insulated by it against the die tip 24 up to the feeding region 8. This is where both polarities meet, a short-circuit current flows and the heating of the molten material 22 in the feeding region 8 is ensured. The geometry of the feeding region 8 preferably corresponds to one of those variants 46 to 46'''' shown in the FIGS. 13*a* to 13*d*.

Figure 7:
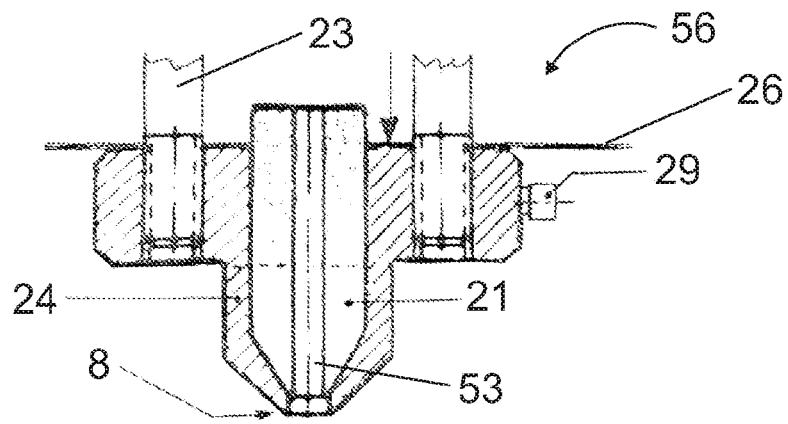
FIG. 7: is a schematic sectional view of an embodiment of an inventive diecasting die in a short design.

FIG. 7 shows a schematic sectional view of an embodiment of an inventive diecasting die 56 in a short, basically monobloc design. The illustration corresponds to that of FIG. 4 whereas the bolt connection 23 and the insulation 26 are only indicated here. The diecasting die 56 is shown without further elements to which it would be connected in inventive applications. The insulator body 21 that has the central molten material runner 53 on the inside is inserted into the die tip 24. The insulator body 21 goes up into the die tip 24 up to the feeding region 8. The die tip 24 is equipped with a power connection 29 and can be calibrated electrically by means of it.

Figure 8:
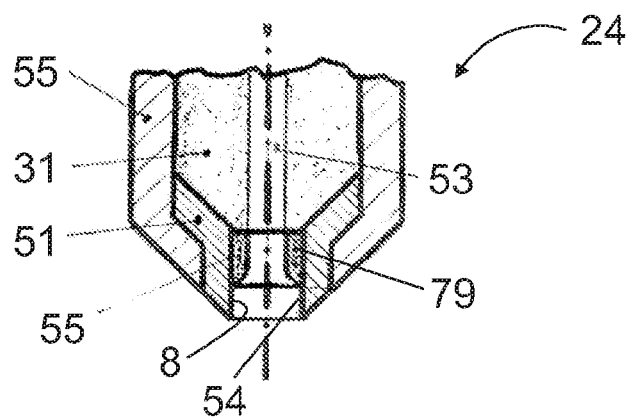
FIG. 8: is a schematic sectional view of an embodiment of a detail of an inventive diecasting die.
Figure 9:
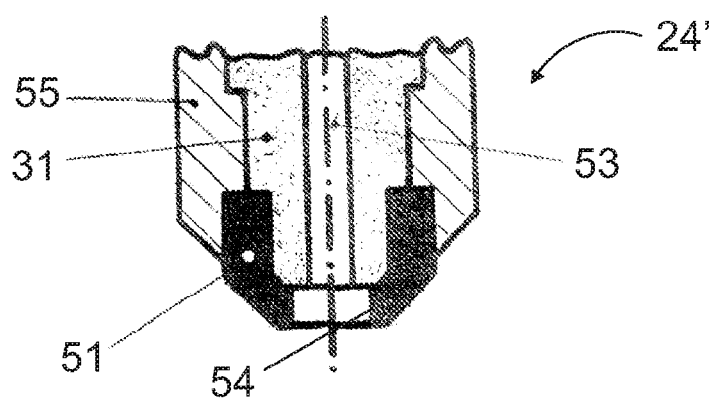
FIG. 9: is a schematic sectional view of another embodiment of a detail of an inventive diecasting die.

FIG. 8 as well as FIG. 9 shows a schematic sectional view of an embodiment of a detail in the die tip 24 area of an inventive diecasting die 7, 20, 30, 45, 56, 60 and 86. The insulator body 31 with the preferably centrally positioned molten material runner 53 (that can alternatively also be led differently through the insulator body 31) has a feeding bushing 51 on its end facing the feeding region 8. The feeding bushing 51 separates the die wall 55 from the short-circuit contact point 54 and is made of a material with properties providing specific advantages on the short-circuit contact point 54. The material has a low wear and advantageous electrolytic properties when interacting with the molten material. The use of a steel alloy containing tungsten, or alternatively a sintered metal, is preferred.

The molten material runner 53 enters into a runner sleeve 79 in the feeding bushing 51 area. It forms the transition from the molten material runner 53 to the feeding region where the short-circuit contact point 54 is located and where a molten material plug is formed alternately that is remelted after its solidification. This region under high thermal and electrolytic strain is separated from the insulator body 31 by the runner sleeve 79. In particular, the runner sleeve 79 is preferably designed a ceramic sleeve that has a different length for different embodiments.

In an alternate embodiment, multiple insulator bodies 31 are designed as a block, i.e. a sealed ceramic bar with bores for the molten material runner 53. In this case the molten material runner 53 ends pointing towards the mould have one runner sleeve 79 each.

The die tip according to FIG. 9 shows, in contrary to the embodiment according to FIG. 8, a monobloc insert, a feeding bushing 51. The feeding bushing 51 is most preferably made of a hardened sintered metal as a part of the die tip 24. The opening in the short-circuit contact point 54 area has cross-sectional geometries as shown in FIGS. 13*a* to 13*d*.

Figure 10A:
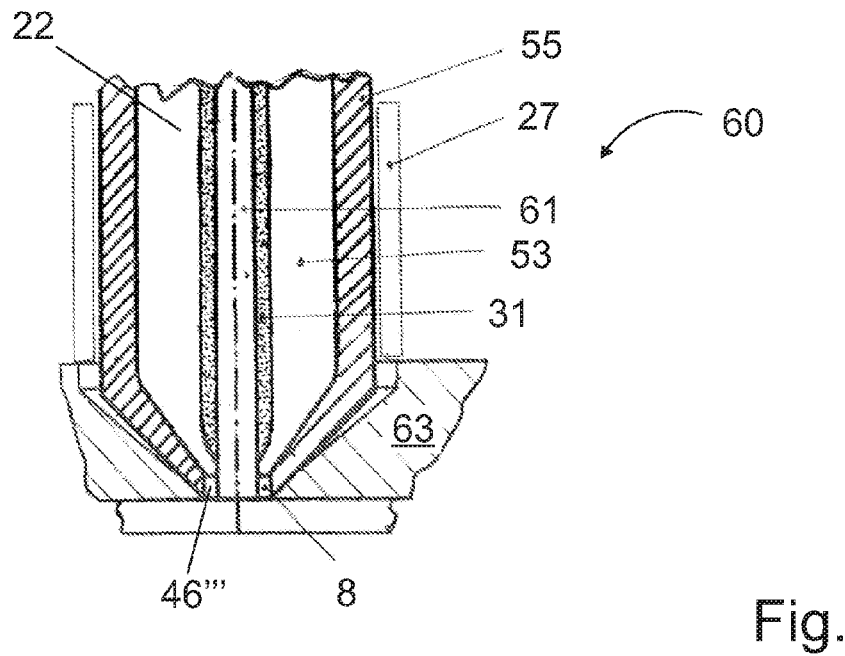
FIG. 10a: is a schematic sectional view of an embodiment of an inventive diecasting die with an insulated metal conductor.

FIG. 10*a* shows a schematic sectional view of an embodiment of an inventive diecasting die 60 with an insulated metal conductor, the electrode 61. The insulation of the electrode 61 is ensured by the insulator body 31 that insulates the electrode 61 against the molten material 22 in the molten material runner 53 around it. At the end of the molten material runner 53, in the feeding region 8, the metal conductor, i.e. the electrode 61, is free from insulation and is in direct contact with the molten material 22. The electrode 61 is also designed to be routed in insulation through the distributor on which the diecasting dies 60 are positioned in order to be contacted electrically outside of the distributor.

In an especially preferred embodiment the electrode 61 is made of tungsten with a temperature-resistant, known non-conducting coating as insulator body 31. An alternative material for the electrode 61 is ceramics, e.g. silicon carbide, of which the conductance will be influenced by means of appropriate contamination. This results in another advantage, since a sufficient power drop on the electrode due to its resistance would cause it to heat and thus function as runner heating to maintain the required molten material temperature across the complete length of the molten material runner 53. Further suitable materials for the electrode 61 beside ceramics and tungsten are envisaged.

The die wall 55, which is made of a thermally insulating material such as titanium and to which is applied a first polarity in an especially preferred embodiment of the invention, is also in contact with the molten material 22. This way the current of the direct resistance heating flows in the feeding region 8 between the die wall 55 and the electrode 61 via the conducting molten material 22. The material is thus heated in the feeding region 8 that has one of the cross-sectional geometries according to the FIGS. 13*a* to 13*d*, preferably according to FIG. 13*c*.

In an alternative embodiment the feeding region 8 is designed as an insulating, wear-resistant insert that preferably can be mounted and replaced separately and/or is made of ceramics. This results in an especially good insulation against the mould 63 and prevent a heat dissipation, which would cause the molten material 22 to solidify resp. for the prevention of this an increased heat introduction. An excessive heating of the mould 63 is also prevented by this design.

Ceramics as material for the insulating, wear-resistant insert is also more resistant to the abrasion that is caused by the molten material 22 injected at high speeds than steel, which loses rigidity due to the molten material 22 effects and wears even faster.

Additionally an alternate embodiment envisages the molten material runner 53 coated with an insulating material, preferably titanium, thus reducing the reheating requirements.

Another alternate embodiment of the inventive diecasting die 60 envisages the molten material runner 53 insulated with a titanium layer or not to be lined with a carbon layer, preferably with a carbon tube, so that the molten material 22 flows inside the carbon tube. This prevents the molten material 22 from forming an alloy with the material of the molten material runner 53, e.g. steel. Additionally, a current can be applied to the carbon tube so that it also heats the molten material runner 53.

Figure 10B:
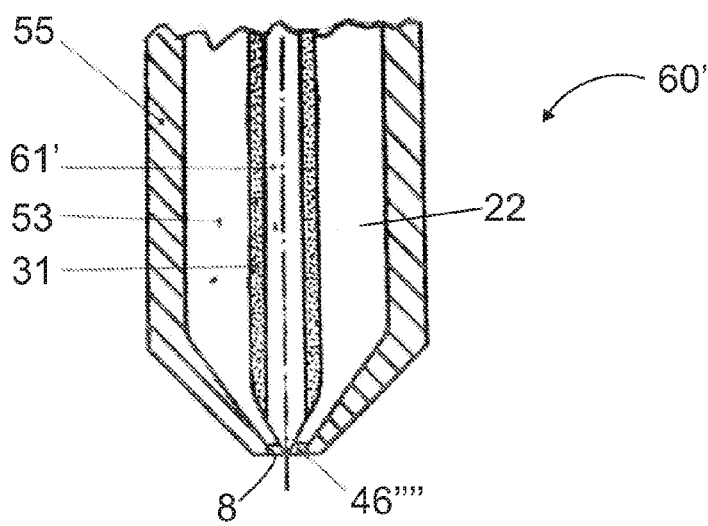
FIG. 10b: is a schematic sectional view of another embodiment of an inventive diecasting die with an insulated metal conductor.

FIG. 10*b* shows a schematic sectional view of another embodiment of an inventive diecasting die 60' with an insulated metal conductor, the electrode 61'. For this embodiment, as already shown in FIG. 10*a*, the molten material 22 flows between the die wall 55 and the metal conductor, the electrode 61', which is insulated against the molten material 22 by the insulator body 31. The end of the metal conductor, the electrode 61', that is free from insulation, is designed as a tip and forms a ring-shaped cross-sectional geometry 46'''' with the feeding region 8 according to FIG. 13*d*.

Figure 10C:
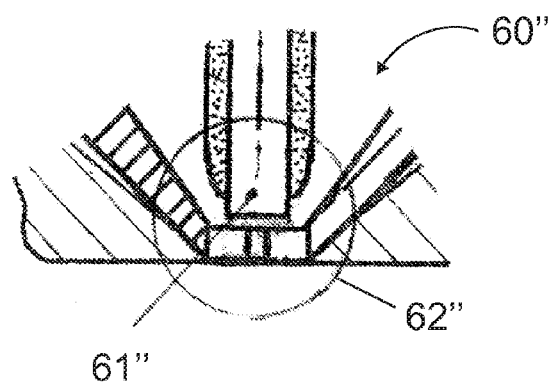
FIG. 10c: is a schematic sectional view of another embodiment of an inventive diecasting die with an insulated metal conductor and a point gate.
Figure 13A:
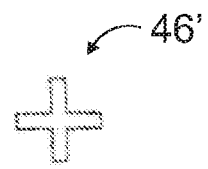
FIGS. 13a to 13d: are schematic views of injection designs of an inventive diecasting die.
Figure 13B:
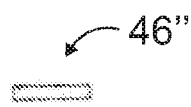
Figure 13C:
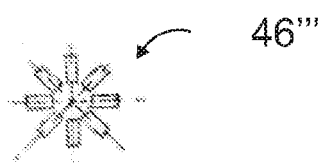
Figure 13D:
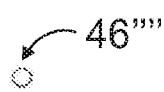

FIG. 10*c* shows a schematic sectional view of another embodiment of an inventive diecasting die 60'' with an insulated metal conductor 62'' and a point gate 62''. The point gate 62'' according to FIG. 13*d* is reached by the end of the metal conductor, the electrode 61', which is recessed with respect to the feeding region 8. This renders the complete cross-section of the injection point 62" utilisable for a molten material flow, thus allowing a larger amount of molten material to be injected unrestrictedly. The Figure furthermore shows a part of the mould 43 onto which the diecasting 60" is put.

The solution according to the FIGS. 10a to 10c is especially well applicable for row moulds for small parts due to its simplified design.

FIG. 11a shows a schematic top view of an embodiment of an inventive diecasting die 86 with an indirect resistance heating elements 88. The shown preferred embodiment envisages three direct resistance heating elements 88 that connect the die wall 55 to the molten material runner 53. The die wall 55 and the molten material runner 53 have different polarities when the direct resistance heating is activated, so that a current flows along the direct resistance heating elements 88. The direct resistance heating elements 88 are thus heated, heat the material around them with which they are in direct contact, and melt it.

FIG. 11b shows is a schematic sectional view of an embodiment of an inventive diecasting die 86 with an indirect resistance heating 88. The die wall 55 is equipped with the connection 9 for the first terminal, wherein the lead 9' is routed for the first terminal up to the end of the diecasting die 86, to the direct resistance heating elements 88. The second terminal is routed via the connection 10 and is routed to the molten material runner 53 via the separate lead 10'. The molten material runner 53 has a cross-sectional geometry according to the FIGS. 13a to 13d that is not visible in the Figure and which controls the escape of the molten material 22. The molten material runner 53, which is insulated against the molten material 22 and the die wall 55 by means of the insulator body 31, is in contact with the direct resistance heating elements 88, thus closing the direct resistance heating circuit.

FIG. 12a shows a schematic sectional view of an embodiment of an inventive diecasting die 86' with an indirect resistance heating 88' and a short conducting molten material runner 53. The end of the diecasting die 86' that has an additional die runner heating 39 is here shown in detail. The die wall 55 and the molten material runner 53, which are insulated against each other through the insulator body 31, approach each other in the direct resistance heating elements 88 region and are electrically connected by these. When a voltage is applied to the direct resistance heating elements 88 a current flows that causes them to heat and remelts the solidified molten material 22 in the die end area.

The insulator body 31 with its large capacity not only ensures the electric insulation and isolation of the two polarities against each other, but is also introduces a thermal insulation effect, rendering the die runner heating 39 of an alternate embodiment obsolete.

FIG. 12b shows a schematic sectional view of an embodiment of an inventive diecasting die 86" with an indirect resistance heating 88 and a long, conducting molten material runner 53. The functionality of the diecasting die 86" is the same as that of the diecasting dies 86 and 86'; however, a lead 10' as in the diecasting die 86 can be omitted, since the molten material runner 53 that is insulated by the insulator body 31 has the second polarity for its full length, while the first polarity is routed along the die wall 55 towards the direct resistance heating elements 88. This design also ensures the remelting of the molten material 22.

FIGS. 13a to 13d show schematic views of cross-sectional gate geometries 46', 46", 46''' and 46'''' of inventive diecasting dies 7, 20, 30, 45, 56, 60 and 86. The cross-sectional geometries are designed as crosstip gate, slotted gate, star gate and point gate. Moreover, a ring-shaped gate cross-section is envisaged, but not shown here.

Figure 14:
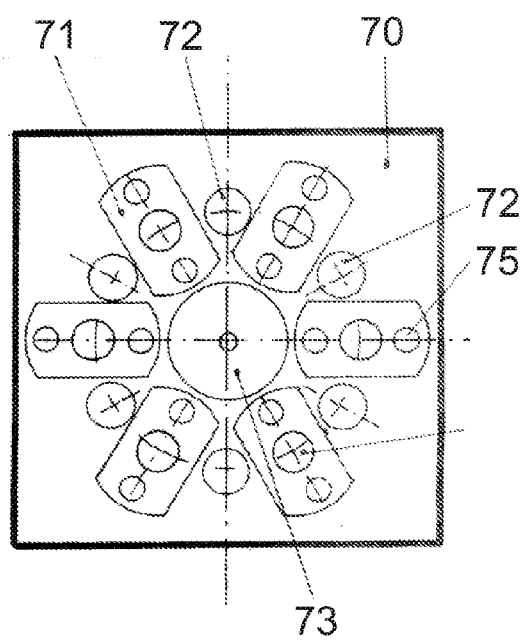
FIG. 14: is a schematic side view of an embodiment of a molten material distributor as interface for inventive diecasting dies.

FIG. 14 shows the molten material sub-distributor 70 as an interface for inventive diecasting dies 7, 20, 30, 45, 56, 60 and 86. The die assemblies 71 are therefore positioned in the form of a partial circle around a feeding point 73, on which the molten material enters the molten material sub-distributor 70 from the molten material main distributor 73, and are connected with bolt connections 75 to the molten material sub-distributor 70. Between the die assemblies 71, heater cartridges 72 are installed in the molten material sub-distributor 70 in order to ensure a stable and sufficiently high temperature of the molten material.

Figure 15A:
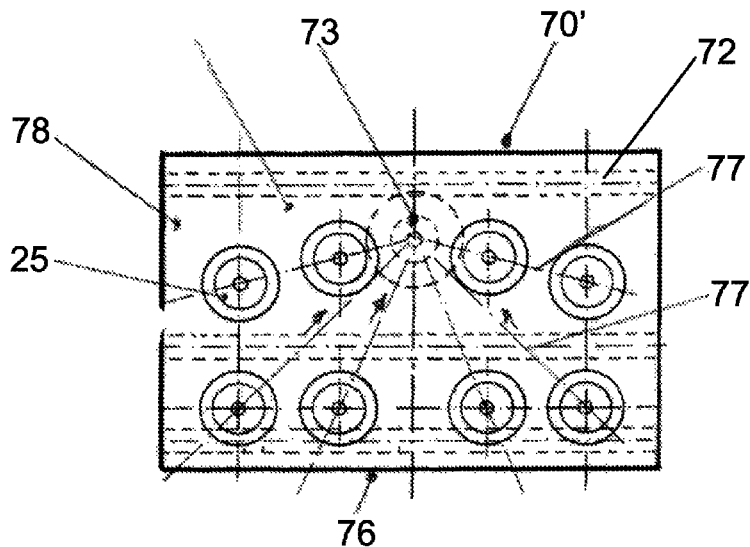
FIG. 15a: is a schematic side view with invisible lines of an embodiment of a molten material distributor as interface for inventive diecasting dies.

FIG. 15a shows a schematic side view with invisible lines of an embodiment of a molten material main distributor 78 as interface for molten material sub-distributors 70. Inserted into the molten material main distributor 78 are distributor bushings 25. According to the illustration FIG. 4, where they serve as connection between the molten material sub-distributor 70 and the diecasting die 56, these form the connection between the molten material main distributor 78 and the molten material sub-distributor 70. The arrows 77 indicate the flow direction for a molten material backflow to the feeding point 73', which ensures an emptying of the molten material main distributor 78 at the end of the manufacturing process. The highest point 76 is positioned on the bottom in the illustration. The molten material main distributor 78 is also equipped with heater cartridges 72 that ensure a constant, sufficiently high temperature in the molten material main distributor 78 and also ensure the flowability of the molten material.

Figure 15B:
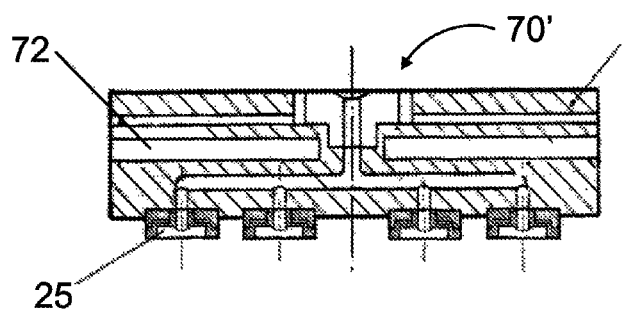
FIG. 15b: is a schematic view of an embodiment of another molten material distributor as interface for inventive diecasting dies.

FIG. 15b shows a schematic view of an embodiment of another molten material main distributor 78 as interface for molten material sub-distributors 70. In the sectional view the molten material runners that extend from the feeding point 73 up to the distributor bushings 25 through the molten material main distributor 78 become visible. Further cavities in the molten material main distributor 78 are designed to receive the heater cartridges 72.

The distributor concept is known in principle from the plastic hot-runner system. The present, deviating, especially advantageous design allows for a molten material backflow to the feeding point 73. The backflow is prevented in an alternate embodiment with an optionally inserted check valve not shown here.

Figure 16:
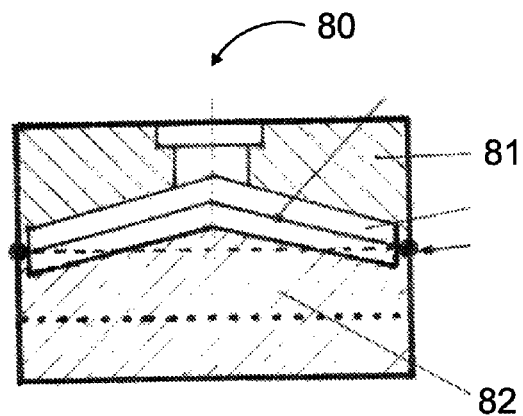
FIG. 16: is a schematic view of an embodiment of another molten material distributor for molten metals with high temperatures.

FIG. 16 shows a schematic view of an embodiment of another molten material distributor 80 for molten metals with high temperatures. It uses the basic design for a molten material distributor 80 that is especially suitable for molten metals with high temperatures, such as aluminium and certain brass alloys. The upper section 81 and the lower section 82 have recesses for ceramic inserts 85. The mating surfaces are designed roof-shaped, but in alternative embodiment also straight.

It is especially advantageous that no special mating fits are required for the ceramic inserts after their insertion into the upper section 81 and the lower section 82, since the ceramics are sealed in an ultrasonic powder slurry after the welding process. It is furthermore advantageous that no danger of a short-circuit given, since the current potential of the distributor equals the potential of the whole diecasting hot-runner system.

Figure 17A:
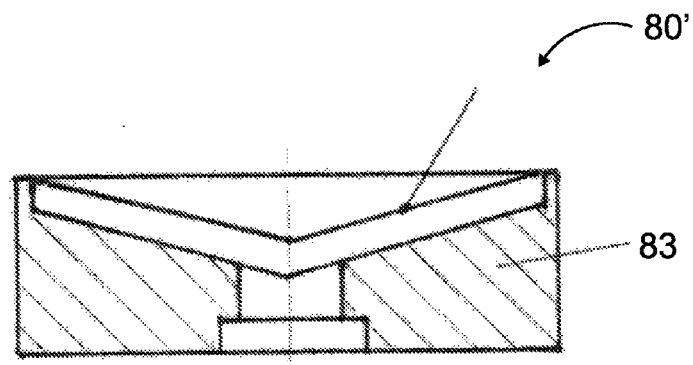
FIG. 17a: is a schematic view of an embodiment of a molten material distributor with ceramic inserts for molten metals with high temperatures.

FIG. 17a shows a schematic sectional view of an embodiment of another molten material distributor 80' with ceramic inserts for molten metals with high temperatures. For this embodiment, the upper plate 83 is equipped with ceramic inserts 85. The design capacity of the upper plate 83 provides enough room for a powerful heating.

Figure 17B:
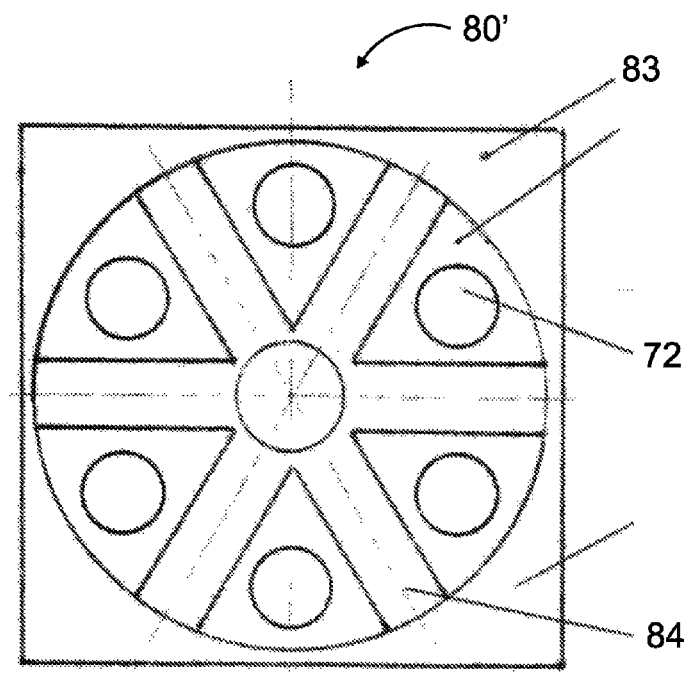
FIG. 17b: is a schematic sectional view of an embodiment of another molten material distributor with ceramic inserts for molten metals with high temperatures.

FIG. 17*b* shows a schematic side view of an embodiment of the molten material distributor 80' from FIG. 17*a*. The runners 84, which are lined with ceramic inserts 85, form a total of six recesses. Inserted into the upper plate 83 are heater cartridges 72 that maintain the temperature in the upper plate 83 at a constant level.

Figure 18:
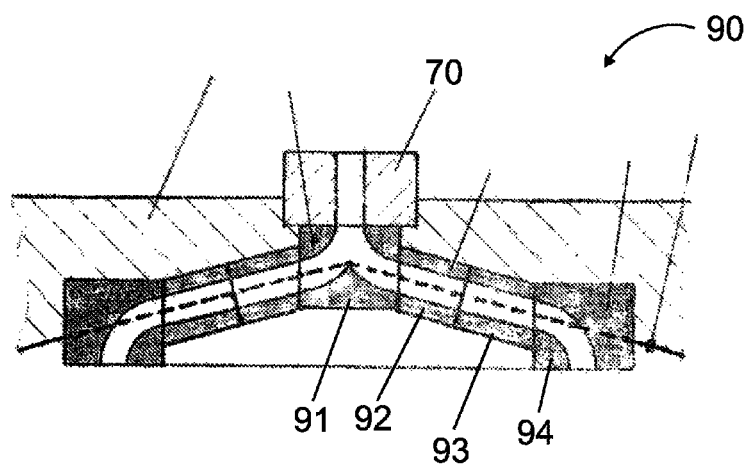
FIG. 18: is a schematic sectional view of an embodiment of another molten material distributor with smelting runners with ceramic cladding for molten metals with high temperatures.

FIG. 18 shows a schematic sectional view of an embodiment of another molten material distributor 90 with smelting runners with ceramic cladding 91, 92, 93 and 94 for molten metals with high temperatures. It is especially advantageous that the molten material runners are made of separate elements. In case of wear of damage they can be replaced individually. Furthermore, the pathway and the length of the runners can be adjusted by using different runner elements.

Figure 19A:
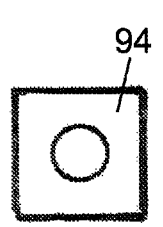
FIGS. 19a to 19f: are schematic views of embodiments of elements of smelting runners with ceramic cladding.
Figure 19B:
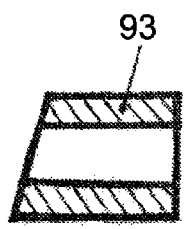
Figure 19C:
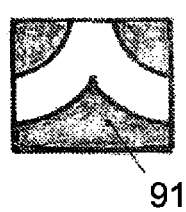
Figure 19D:
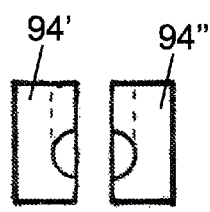
Figure 19E:
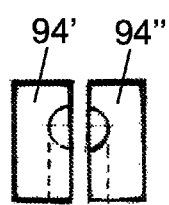
Figure 19F:
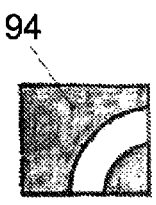

FIGS. 19*a* to 19*f* show schematic views of embodiments of elements of smelting runners with ceramic cladding 91, 92, 93, 94. FIG. 19*a* shows a runner element 92 with a straight duct in side view. FIG. 19*b* shows another runner element 93 with a straight duct in sectional view. FIG. 19*c* shows the runner element 91 that is adjacent to the distributor bushing 25, which is connected to the molten material main distributor not shown here; the element functions as distributor itself. The FIGS. 19*d* to 19*f* show the arc-shaped runner element 94 that is designed with two shells as the runner element 91. Due to the more complex inner design a two-shell embodiment is more advantageous for a simpler manufacturing process, while also simplifying cleaning and maintenance.

The inventive method is not only applicable for zinc alloys (420° C.) but for magnesium (360° C.) as well. Since the melting points for magnesium and aluminium (660° C.) are relatively close together, aluminium can be processed in the diecasting hot-runner system 1 as well. Furthermore, the application for lead (327° C.) and tin (232° C.) is envisaged. Brass and bronze have, depending on the percentage of the different alloy components, different melting points, which can however amount to up to 800° C. To process brass, the inventive lining of the runners 84, 91, 92, 93, 94 with ceramics is required.

In this case it is furthermore advantageous to use the direct resistance heating with the direct resistance heating elements 88, since this applies a temperature on the molten material 22 in the feeding region 8 that is independent from the conductance and the melting points of the alloy components and can be specified, adjusted and reproduced.

LIST OF REFERENCE NUMERALS

1 Diecasting hot-runner system
2 Smelter
3 Molten material
4 Piston
5 Cylinder
6 Runner
7 Diecasting die
8 Feeding region
9 Connection of first terminal
9' Lead of first terminal
10 Connection of second terminal
10' Lead of second terminal
11 Current control device
12 Transformer
13 Activation timing device
20 Diecasting die, short
21 Insulator body
22 Molten material
23 Bolt connection
24 Die tip
25 Distributor bushing
26 Insulator
27 Heating
28 Insulation ring
29 Power connection
30 Diecasting die, heated, long
31 Insulator body
32 Power connection
33 Power connection
34 First die element
35 Second die element
36 Insulator
37 Insulator
38 Insulation ring
39 Die runner heating
40 Check valve
41 Sealing element
42 Valve seat
43 Upper plate of the mould
44 Lower plate of the mould
45 Diecasting die, long
46-46" Cross-sectional gate geometries
47 Distributor die (short)
50, 50' Diecasting die
51 Feeding bushing
52 Insulation sleeve
53 Molten material runner
54 Short-circuit contact point
55 Die wall
56 Diecasting die
60-60" Diecasting die
61, 61' Electrode
62-62" Injection point (ring gate)
63 Mould
70, 70' Molten material sub-distributor
71 Diecasting die assembly
72 Heater cartridge
73, 73' Feeding point
74 Distributor interface
75 Bolt connection
76 Highest point
77 Flow direction
78 Molten material main distributor
79 Runner sleeve
80, 80' Distributor
81 Upper section
82 Lower section
83 Upper plate
84 Runners
85 Ceramic insert
86-86" Diecasting die with indirect heating
88 Direct resistance heating element
90 Runners with ceramic lining
91-94 Runner elements

The invention claimed is:

1. Hot chamber diecasting method for sprueless diecasting, wherein a plug of solidified molten material (22) (that can be remelted) forms in a diecasting die (7, 20, 30, 45, 50, 50', 60, 60', 60", 86, 86', 86") having a direct resistance heating in a feeding region, interrupting flow of molten material (22), characterised in the process steps of Closing a mould (43, 44),
Heating the diecasting die (7, 20, 30, 45, 50, 50', 60, 60', 60", 86, 86', 86") and fully remelting the plug in the feeding region (8) of the diecasting die (7, 20, 30, 45, 50, 50', 60, 60', 60", 86, 86', 86") by increasing direct resistance heating output, Aborting the heating by decreasing the direct resistance heating output, Injection of the molten material (22) into the mould (43, 44), Maintaining the pressure of the molten material (22), Solidification of the molten material (22) in the mould (43, 44), Solidification of the molten material (22) in the feeding region (8) of the diecasting die (7, 20, 30, 45, 50, 50', 60, 60', 60", 86, 86', 86"), Opening the mould (43, 44) and Demoulding a cast part from the mould (43, 44).

2. Method according to claim 1, characterised in that the process step of aborting the heating is succeeded by the diecasting die (7, 20, 30, 45, 50, 50', 60, 60', 60", 86, 86', 86") being put onto the mould (43, 44) together with the feeding region (8), and that the solidification of the molten material (22) in the mould (43, 44) and in the feeding region (8) of the diecasting die (7, 20, 30, 45, 50, 50', 60, 60', 60", 86, 86', 86") is succeeded by the lifting of the diecasting die (7, 20, 30, 45, 50, 50', 60, 60', 60", 86, 86', 86") from the mould (43, 44).

3. Method according to claim 1, characterised in that the polarity of the direct resistance heating is chosen dependent on the materials of the diecasting die (7, 20, 30, 45, 50, 50', 60, 60', 60", 86, 86', 86") and the molten material in such manner that minimises the electrolytic influence and the wear of the feeding region (8).

4. Method according to claim 1, characterised in that the direct resistance heating output in the feeding region (8) is controlled in such manner that minimises the wear of the feeding region (8).

* * * * *